United States Patent
Wang et al.

(10) Patent No.: US 8,312,474 B2
(45) Date of Patent: Nov. 13, 2012

(54) METHOD, APPARATUS, AND SYSTEM FOR APPLYING TIMED OPERATIONS TO NON-TIMED FUNCTIONS

(75) Inventors: Zhong Ping Wang, ChangZhou (CN); Matthew John Ward, Vail, AZ (US)

(73) Assignee: International Business Machines Corporation, Armonk, NY (US)

( * ) Notice: Subject to any disclaimer, the term of this patent is extended or adjusted under 35 U.S.C. 154(b) by 932 days.

(21) Appl. No.: 12/368,102

(22) Filed: Feb. 9, 2009

(65) Prior Publication Data

US 2010/0205613 A1    Aug. 12, 2010

(51) Int. Cl.
*G06F 9/44* (2006.01)
*G06F 9/46* (2006.01)
(52) U.S. Cl. ........................... 719/315; 718/100
(58) Field of Classification Search .................. 719/315; 718/100; 714/47
See application file for complete search history.

(56) References Cited

U.S. PATENT DOCUMENTS

| 7,774,779 B2* | 8/2010 | Seelig et al. .................. 718/100 |
| 2004/0216125 A1* | 10/2004 | Gazda et al. .................. 719/310 |
| 2007/0261067 A1 | 11/2007 | Jones et al. |
| 2008/0046785 A1* | 2/2008 | Gilgen et al. .................. 714/47 |

OTHER PUBLICATIONS

Mitch Cherniack, Hari Balakrishnan, Magdalena Balazinska Don Carney, "Scalable Distributed Stream Processing", 2003.*
Tom Goodale et al., A Simple API for Grid Applications (SAGA), SAGA-CORE-WG, Version: 1.0 Jan. 15, 2008.

* cited by examiner

*Primary Examiner* — Lechi Truong
*Assistant Examiner* — Abdou Seye
(74) *Attorney, Agent, or Firm* — Kunzler Law Group, PC

(57) ABSTRACT

An encapsulation module encapsulates a function in a timed method adapter. A caller calls the timed method adapter in place of the function. The timed method adapter calls a set invoker. The set invoker saves an argument, calls an invoke thread, and returns to the timed method adapter. The invoke thread invokes the function and passes the function an object and the argument. The timed method adapter further waits for an execution result from the function and monitors for an expiration of a timeout. If the function returns the execution result before expiration of the timeout, the timed method adapter returns the execution result to the caller. If the timeout expires before the function returns the execution result, the timed method adapter directs the invoke thread to cancel the function and returns a timeout exception to the caller.

16 Claims, 6 Drawing Sheets

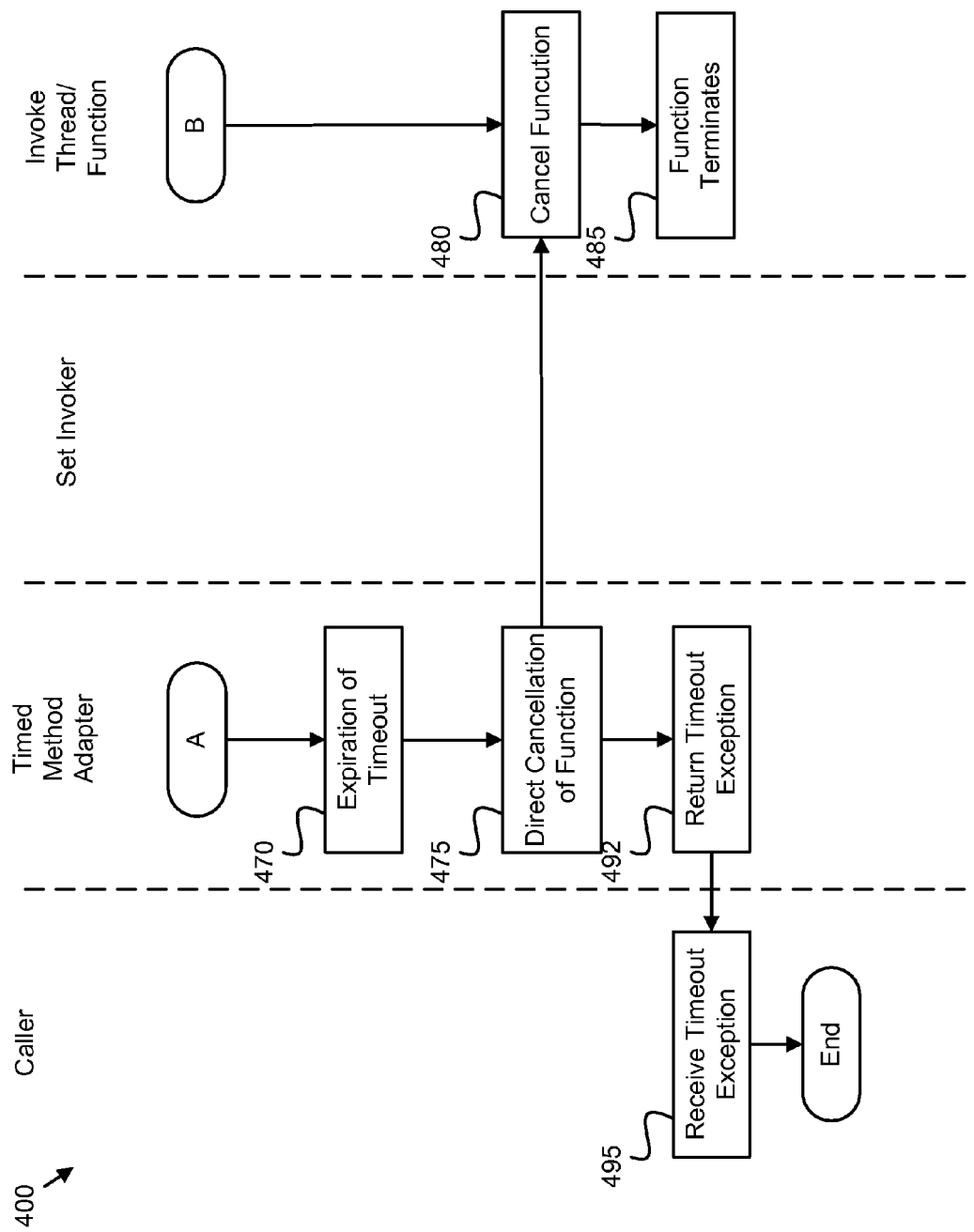

ns, apparatus, and system that applies timed operations to non-timed functions. Beneficially, such a method, apparatus, and system would allow the use of non-timed functions such as functions from a standard library as timed functions.

METHOD, APPARATUS, AND SYSTEM FOR APPLYING TIMED OPERATIONS TO NON-TIMED FUNCTIONS

BACKGROUND

1. Field

This invention relates to timed operations and more particularly relates to applying timed operations to non-timed functions.

2. Description of the Related Art

Programmers typically write software using libraries of functions and Application Program Interfaces (API). The functions and APIs are referred to herein as functions. Using functions enables a programmer to quickly add tested code with a desired functionality.

Unfortunately, many functions do not support to timed operations. A programmer may use a timed operation to terminate a function if the execution of the function exceeds the timeout time interval. For example, a programmer may wish code to execute a search function, but terminate the search function if the result is not found within five milliseconds. However, a search function in a typical library will not support a timed operation.

SUMMARY

From the foregoing discussion, there is a need for a method, apparatus, and system that applies timed operations to non-timed functions. Beneficially, such a method, apparatus, and system would allow the use of non-timed functions such as functions from a standard library as timed functions.

The present invention has been developed in response to the present state of the art, and in particular, in response to the problems and needs in the art that have not yet been fully solved by currently available timed operation application methods. Accordingly, the present invention has been developed to provide a method, apparatus, and system for applying timed operations to non-timed functions that overcome many or all of the above-discussed shortcomings in the art.

A method of the present invention is presented for applying timed operations to non-timed functions. In one embodiment, the method includes encapsulating a function, calling a timed method adapter, calling a set invoker, calling invoke thread, returning from the set invoker, waiting for an execution result, invoking the function, returning the execution result or directing the cancellation of the function and returning a timeout exception.

An encapsulation module encapsulates a function in a timed method adapter. A caller calls the timed method adapter in place of the function, passing the timed method adapter an object and an argument for the function.

The timed method adapter calls a set invoker, passing the set invoker the object, the function, and the argument for the function. The set invoker saves the argument, calls an invoke thread, and returns to the timed method adapter. The invoke thread invokes the function and passes the function the object and the argument.

The timed method adapter further waits for an execution result from the function and monitors for an expiration of a timeout. If the function returns the execution result before expiration of the timeout, the timed method adapter returns the execution result to the caller. If the timeout expires before the function returns the execution result, the timed method adapter directs the invoke thread to cancel the function and returns a timeout exception to the caller.

The apparatus for applying timed operations to non-timed functions is provided with a plurality of modules configured to functionally execute the steps of the method. The modules include an encapsulation module, a timed method adapter, a set invoker, and an invoke thread.

The encapsulation module encapsulates a function in the timed method adapter. A caller calls the timed method adapter in place of the function, passing the timed method adapter an object and an argument for the function.

The timed method adapter calls the set invoker, passing the set invoker the object, the function, and the argument for the function. The set invoker saves the argument, calls the invoke thread, and returns to the timed method adapter. The invoke thread invokes the function and passes the function the object and the argument.

The timed method adapter further waits for an execution result from the function and monitors for an expiration of a timeout. If the function returns the execution result before expiration of the timeout, the timed method adapter returns the execution result to the caller. If the timeout expires before the function returns the execution result, the timed method adapter directs the invoke thread to cancel the function and returns a timeout exception to the caller.

A system of the present invention is also presented for applying timed operations to non-timed functions. The system may be embodied in a software development environment executing on a computer. In particular, the system, in one embodiment, includes an encapsulation module, a caller, a timed method adapter, a set invoker, and an invoke thread.

The encapsulation module encapsulates a function in the timed method adapter. The caller calls the timed method adapter in place of the function, passing the timed method adapter an object and an argument for the function.

The timed method adapter calls the set invoker, passing the set invoker the object, the function, and the argument for the function. The set invoker saves the argument, calls the invoke thread, and returns to the timed method adapter. The invoke thread invokes the function and passes the function the object and the argument.

The timed method adapter further waits for an execution result from the function and monitors for an expiration of a timeout. If the function returns the execution result before expiration of the timeout, the timed method adapter returns the execution result to the caller. If the timeout expires before the function returns the execution result, the timed method adapter directs the invoke thread to cancel the function and returns a timeout exception to the caller.

References throughout this specification to features, advantages, or similar language do not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The present invention encapsulates a non-timed function in a timed method adapter, allowing timed-operations to be used with the non-timed function. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIGS. 4A-4C are schematic flow chart diagrams illustrating one embodiment of a method of applying timed operations of the present invention.

DETAILED DESCRIPTION

Many of the functional units described in this specification have been labeled as modules, in order to more particularly emphasize their implementation independence. Modules may include hardware circuits such as one or more processors with memory, Very Large Scale Integration (VLSI) circuits, gate arrays, programmable logic, and/or discrete components. The hardware circuits may perform logic functions, execute computer readable programs stored on tangible storage devices, and/or execute programmed functions. Modules may also include a computer readable storage medium comprising a computer readable program stored on a tangible storage device that performs a function when executed by a hardware circuits such as a processor, microcontroller, or the like.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
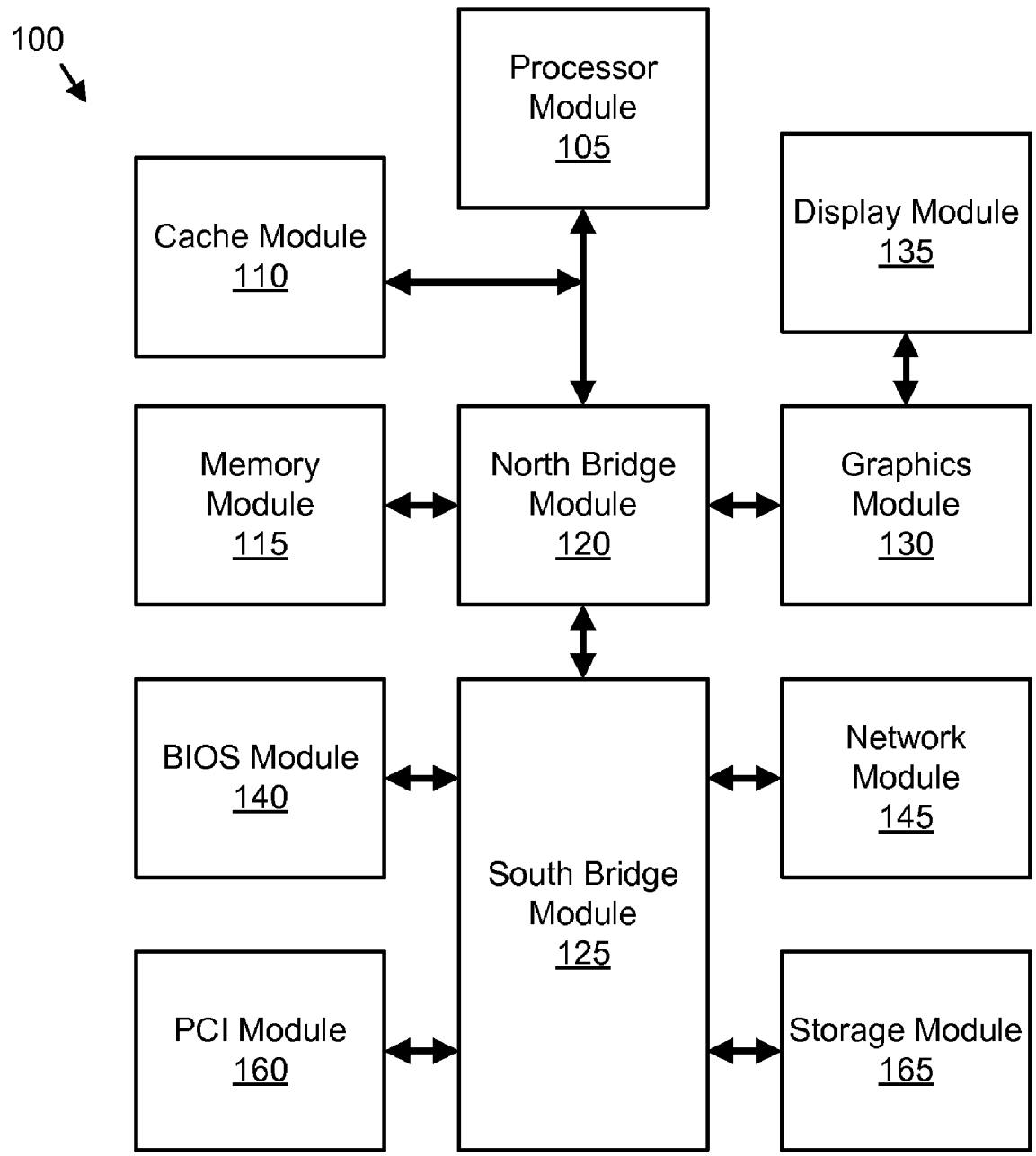
FIG. 1 is a schematic block diagram illustrating one embodiment of a computer in accordance with the present invention.

FIG. 1 is a schematic block diagram illustrating one embodiment of a computer 100 in accordance with the present invention. The computer 100 includes a processor 105, a cache 110, a memory 115, a north bridge module 120, a south bridge module 125, a graphics module 130, a display module 135, a basic input/output system (BIOS) module 140, a network module 145, a peripheral component interconnect (PCI) module 160, and a storage module 165.

The processor 105, cache 110, memory 115, north bridge module 120, south bridge module 125, graphics module 130, display module 135, BIOS module 140, network module 145, PCI module 160, and storage module 165, referred to herein as components, may be fabricated of semiconductor gates on one or more semiconductor substrates. Each semiconductor substrate may be packaged in one or more semiconductor devices mounted on circuit cards. Connections between the components may be through semiconductor metal layers, substrate-to-substrate wiring, circuit card traces, and/or wires connecting the semiconductor devices.

The memory 115 stores computer readable programs. The processor 105 executes the computer readable programs as is well known to those skilled in the art. The computer readable programs may also be tangibly stored in the storage module 165. The storage module 165 may be a hard disk drive, an optical storage device, a holographic storage device, a micromechanical storage device, a semiconductor storage device, or the like.

The processor 105 may communicate with the cache 110 through a processor interface bus to reduce an average time to access memory 115. The cache 110 may store copies of the data from the most frequently used memory locations. The computer 100 may use one or more caches 110 such as a DDR2 cache memory or the like.

The north bridge module 120 may communicate with and provide bridging functionality between the processor 105, the graphic module 130, the memory 115, and the cache 110. The processor 105 may be connected to the north bridge module 120 over a, for example, six hundred sixty seven Megahertz (667 MHz) front side bus.

The north bridge module 120 may be connected to the south bridge module 125 through a direct media interface (DMI) bus. The DMI bus may provide a high-speed, bi-directional, point-to-point link supporting a clock rate for example of one Gigabytes per second (1 GBps) in each direction between the north bridge module 120 and the south bridge module 125. The south bridge module 125 may support and communicate with the BIOS module 140, the network module 145, the PCI module 160, and the storage module 165.

The PCI module 160 may communicate with the south bridge module 125 for transferring data or power to peripheral devices. The PCI module 160 may include a PCI bus for attaching the peripheral devices. The PCI bus can logically connect several peripheral devices over the same set of connections. The peripherals may be selected from a printer, a joystick, a scanner, or the like. The PCI module 160 may also be an expansion card as is well known to those skilled in the art.

The BIOS module 140 may communicate instructions through the south bridge module 125 to boot the computer 100, so that computer readable software instructions stored on the storage module 165 can load, execute, and assume control of the computer 100. Alternatively, the BIOS module 140 may comprise a coded program embedded on a chipset that recognizes and controls various devices that make up the computer 100.

The network module 145 may communicate with the south bridge module 125 to allow the computer 100 to communicate with other devices over a network. The devices may include routers, bridges, computers, printers, and the like.

The display module 135 may communicate with the graphic module 130 to display information as will be described hereafter. The display module 135 may be a cathode ray tube (CRT), a liquid crystal display (LCD) monitor, or the like.

Figure 2:
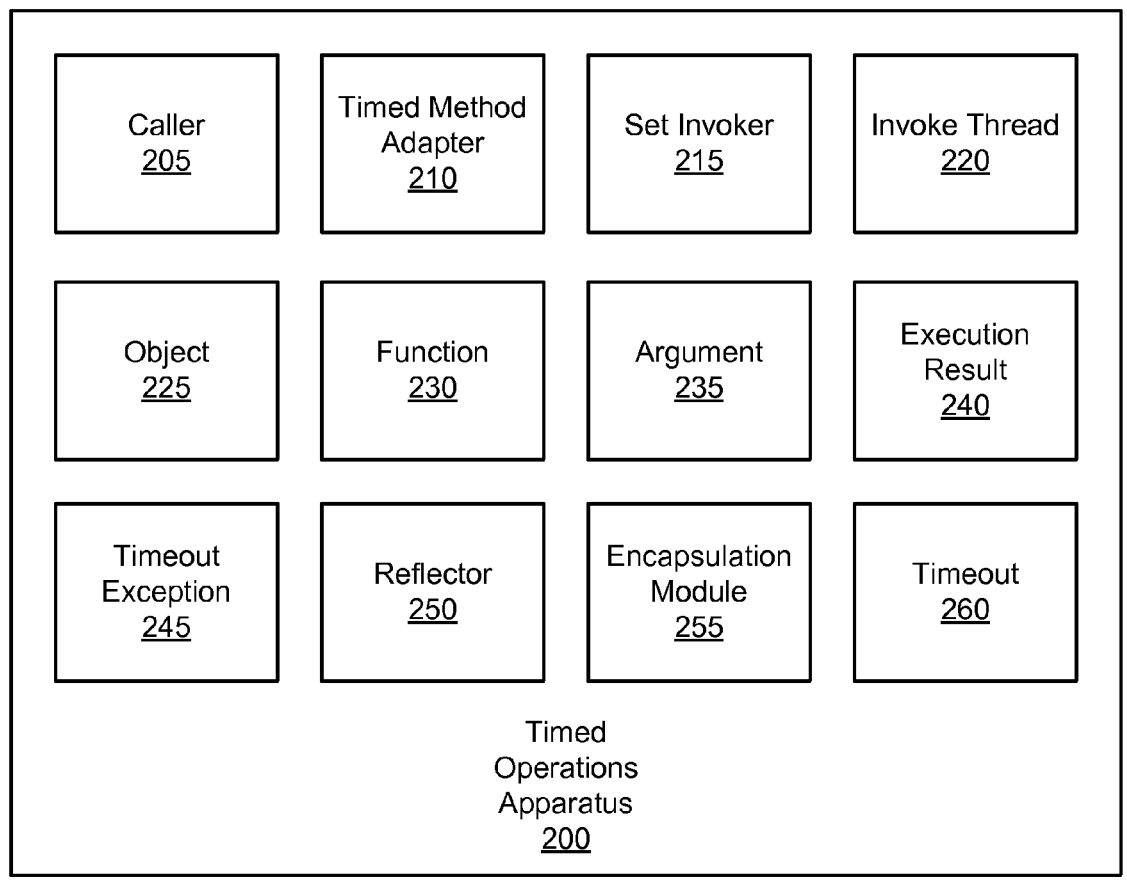
FIG. 2 is a schematic block diagram illustrating one embodiment of a timed operations apparatus of the present invention.

FIG. 2 is a schematic block diagram illustrating one embodiment of a timed operations apparatus 200 of the present invention. The apparatus 200 may be embodied in a software development environment executing on the computer 100 of FIG. 1. The description of the apparatus 200 refers to elements of FIG. 1, like numbers referring to like elements. In one embodiment, the apparatus 200 includes a caller 205, a timed method adapter 210, a set invoker 215, an invoker thread 220, an object 225, a function 230, an argument 235, an execution result 240, a timeout exception 245, a reflector 250, an encapsulation module 255, and a timeout 260.

The caller 205, timed method adapter 210, set invoker 215, invoker thread 220, object 225, function 230, argument 235, execution result 240, timeout exception 245, reflector 250, encapsulation module 255, and timeout 260 may each be embodied in a computer readable storage medium comprising computer readable program stored on a tangible storage device. The computer readable program may be executed by a processor such as a processor 105 of FIG. 1.

The caller 205 may be a computer readable program that requires the use of the function 230. In a certain embodiment, the caller 205 passes control to the function 230. The function 230 may perform a specified process and then return control to the caller 205 as is well known to those of skill in the art.

In one embodiment, the function 230 is part of a standard library of functions. The function 230 may be a subroutine, a function, an API, or the like. Alternatively, the function 230 may comprise legacy code that cannot easily be modified without unintended consequences.

The function 230 is not configured to perform timed operations. For example, the function 230 may not be designed to return control to the caller 205 within a specified time interval regardless of whether the function 230 has completed the function's process.

The object 225 may be a data structure. In one embodiment, the object 225 is passed to the function 230 when the function 230 is called by the caller 205. The object 225 may receive the results of the function's process. Alternatively, the object 225 may communicate data residing in the data structure to the function 230.

The argument 235 may be a value that is passed to the function 230 when the function 230 is called by the caller 205. For example, a search function 230 may receive an argument 235 with a string value. The argument 235 may be a plurality of arguments or values.

The function 230 returns the execution result 240 to the caller 205 when the function 230 has completed the function's process. In one embodiment, the execution result 240 is returned to the caller 205 in the object 225.

The encapsulation module 255 encapsulates the function 230 in the timed method adapter 210 as will be described hereafter. In one embodiment, the caller 205 calls the timed method adapter 210 in place of the function 230. In addition, the caller 205 may pass the timed method adapter 210 the object 225 and the argument 235 instead of passing the object 225 and argument 235 to the function 230. By encapsulating the function 230, the caller 205 may call the timed method adapter 210 in order to perform the process performed by the function 230.

The timed method adapter 210 supports timed operations. For example, the timed method adapter 210 may be configured to return control to the caller 205 after 5 milliseconds have elapsed regardless of whether or not the timed method adapter 210 has completed the timed method adapter's process.

The timed method adapter 210 may perform a number of specific timed operations such as polling a current time and polling the function 230 to determine if the function 230 has completed the function's process. In one embodiment, the timed method adapter determines if the timeout 260 has expired. The timeout 260 may be a maximum time interval that the function 230 is allowed to execute. If the execution of the function 230 exceeds the timeout 260, the timed method adapter 210 returns the timeout exception 245 to the caller 205. In one embodiment, the timeout exception 245 communicates to the caller 205 that the timed method adapter 210 was unable to complete execution of the function 230 within the timeout time interval.

Thus by calling the timed method adapter 210, the caller 205 can perform the process of the function 230 as a timed operation. The timed method adapter 210 may be a universal adapter. Thus the timed method adapter 210 may encapsulate any function 230 within a specified programming language. For example, the timed method adapter 210 may be used to encapsulate either a search function or a hash function.

The timed method adapter 210 calls the set invoker 215 in preparation to invoking the function 230. In one embodiment, timed method adapter 210 passes the object 225, the function 230, and the argument 235 to the set invoker 215. The set invoker 215 may save the argument 235. In addition, the set invoker 215 calls the invoke thread 220 and returns to the timed method adapter 210.

The invoke thread 220 invokes the function 230. In addition, the invoke threads 220 passes the function 230 the object 225 and the argument 235. If the timeout 260 expires before the function 230 returns the execution result, the timed method adapter 210 may direct the invoke thread 220 to cancel the function 230 and may return the timeout exception 245 to the caller 205.

The reflector 250 receives the function 230 and reflects back the object 225 and the argument 235 of the function 230. The reflector 250 may be used when the function 230 is not well understood and/or well documented.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 3:
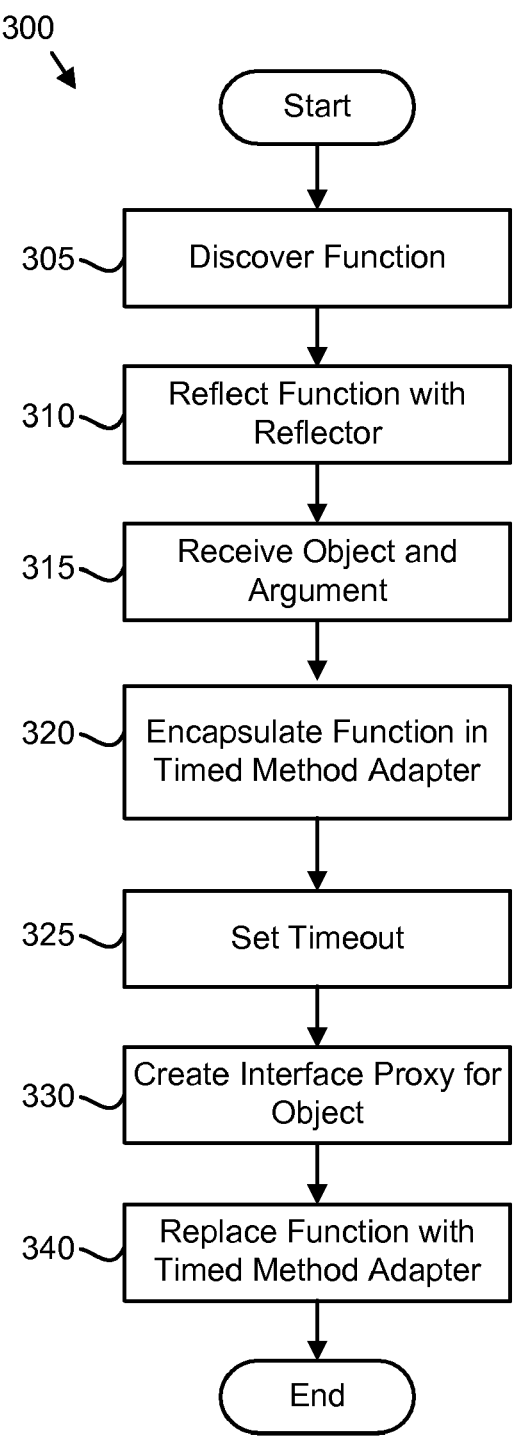
FIG. 3 is a schematic flow chart diagram illustrating one embodiment of an encapsulation method of the present invention.

FIG. 3 is a schematic flow chart diagram illustrating one embodiment of an encapsulation method 300 of the present invention. The method 300 substantially includes the steps to carry out the functions presented above with respect to the operation of the described computer 100 and apparatus 200 of FIGS. 1-2. In one embodiment, the method 300 is implemented with a computer readable storage medium comprising a computer readable program stored on a tangible storage device. The computer readable storage medium may be integrated into a computing system, such as the computer 100, wherein the computer readable program executed by the computing system performs the method 300.

The method 300 automatically encapsulates the function 230 in the timed method adapter 210 and makes the timed method adapter 210 available in place of the function 230. In one embodiment, the method 300 starts and the encapsulation module 255 discovers 305 the function 230. The encapsulation module 255 may discover 305 the function 230 by parsing source code for the caller 205. In an alternate embodiment, the encapsulation module 255 may discover 305 the function 230 when the function 230 is presented to the encapsulation module 255. In a certain embodiment, the encapsulation module 255 discovers 305 the function 230 by trapping calls to the function 230. The function 230 may be a JAVA compatible function, C# compatible function, or a Ruby compatible function. One of skill in the art will recognize that the invention may be practiced with functions 230 of other programming languages.

In one embodiment, the reflector 250 reflects 310 the function 230. The encapsulation module 255 may receive 315 the object 225 and the argument 235 for the function 230 from the reflector 250. Table 1 illustrates one embodiment of reflecting 310 a function F, where the a target object objTarget is defined for the object 225 O, F is a JAVA® function 230, and the reflector 250 returns a plurality of arguments 235 to argList in response to argList[i].getClass( ), where i is an integer. Function F is then invoked using objTarget and argList.

TABLE 1 objTarget = O;
java.lang.reflect.Method F = Type.getDeclaredMethod("DomeMethod",
new Class[ ]{argList[0].getClass( ), ..., argList[n].getClass( ) } );
F.invoke(objTarget, argList);

In an alternate embodiment, Table 2 illustrates reflecting 310 a function F, where the a target object objTarget is defined for the object 225 O, F is a C# function 230, and the reflector 250 returns a plurality of arguments 235 to argList in response to argList[i].getType( ), where i is an integer. Function F is then invoked using objTarget and argList.

TABLE 2 objTarget = O;
System.Reflection.MethodInfo F = Type.GetMethod("DomeMethod",
BindingFlags.Public|BindingFlags.Instance, new
Type[ ]{ argList[0].getType( ), ...,
argList[n].getType( ) } );
F.Invoke(objTarget, argList);

Table 3 illustrates another embodiment of the reflector 250 reflecting 310 a function F, where the a target object objTarget is defined for the object 225 O, F is a Ruby function 230, and the reflector 250 returns a plurality of arguments 235 to argList in response to argList[i].getClass( ), where i is an integer. Function F is then invoked using argList.

TABLE 3 objTarget = Type.new
F = objTarget.method 'DomeMethod'
F.call argList[0], ...argList[n]

The encapsulation module 255 further encapsulates 320 the function 230 in the timed method adapter 210 with the timeout 260 and set 325 the timeout 260 to a specified time interval. The encapsulation module 255 may encapsulate 320 the function 230 in the timed method adapter 210 as shown in Table 4. Table 4 illustrates the definition of a timed method adapter 210 "adapter." The timeout 260 of the timed method adapter 210 "adapter" is then set 325 to "timeout_value" with the instruction "adapter.setTimeout(timeout_value );" where "timeout_value" is a number expressing a time interval measured in specified units such as seconds, milliseconds, microseconds, and the like. Table 4 further shows the timed method adapter 210 "adapter" is invoked with the instruction "adapter.invoke(O, F, A);" where O is the object, F is the function, and A is the argument.

TABLE 4

TimedMethodAdapter adapter = new TimedMethodAdapter( );
adapter.setTimeout( timeout_value );
adapter.invoke( O, F, A);

In an alternate embodiment, the encapsulation module 255 encapsulates the function 230 using the instruction of Table 5, where O is the object, F is the function, and A is the argument.

TABLE 5 public Object invoke(O, F, A) throws Throwable

In one embodiment, the encapsulation module 255 creates 330 an interface proxy for the object 255 as shown in Table 6. The instruction "adapter.setTarget(objObjectOutputStream);" sets the object 225. The instruction "ObjectOutput oos=(ObjectOutput)Proxy.newProxyInstance(classLoader, new Class[]{ObjectOutput.class}, adapter);" then creates 330 the interface proxy and creates a class loader. In one embodiment, the instruction "oos.writeObject( . . . );" may then implicitly invoke the timed method adapter 210.

TABLE 6

TimedMethodAdapter adapter = new TimedMethodAdapter( );
adapter.setTarget(objObjectOutputStream);
adapter.setTimeout(timeout_value);
ObjectOutput oos = (ObjectOutput)Proxy.newProxyInstance(classLoader,
new Class[ ]{ObjectOutput.class }, adapter );
oos.writeObject( ... );

In one embodiment, the encapsulation module 255 replaces 340 the function 230 with the timed method adapter 210 and the method 300 ends. Thus the caller 205 of the function 230 will invoke the timed method adapter 210 instead of the function 230. In a certain embodiment, the encapsulation module 255 further modifies the caller 205 to operate with the timed method adapter 210. For example, the encapsulation module 255 may modify the caller 205 to receive the timeout exception 245 as well as the execution result 240.

Figure 4A:
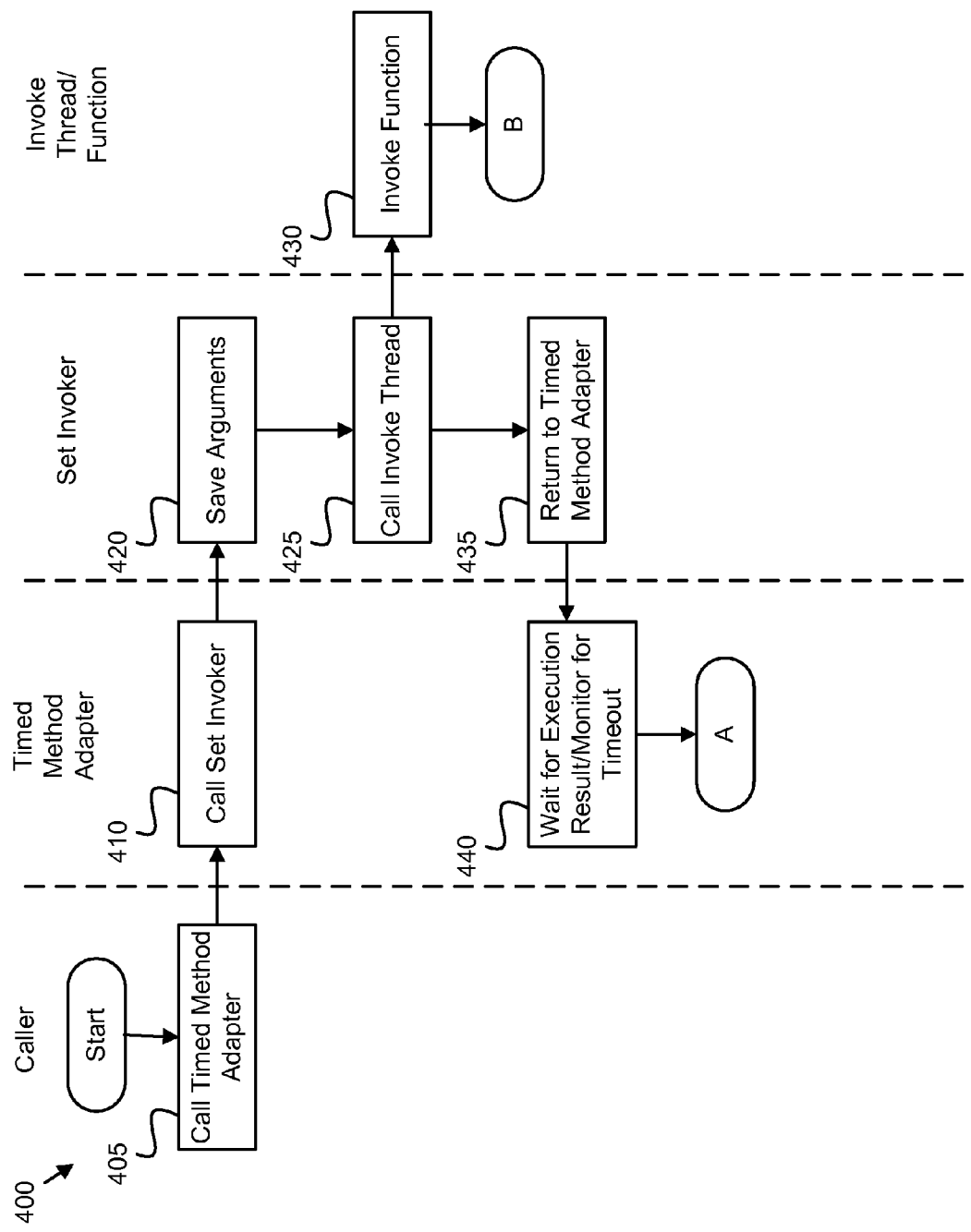
Figure 4B:
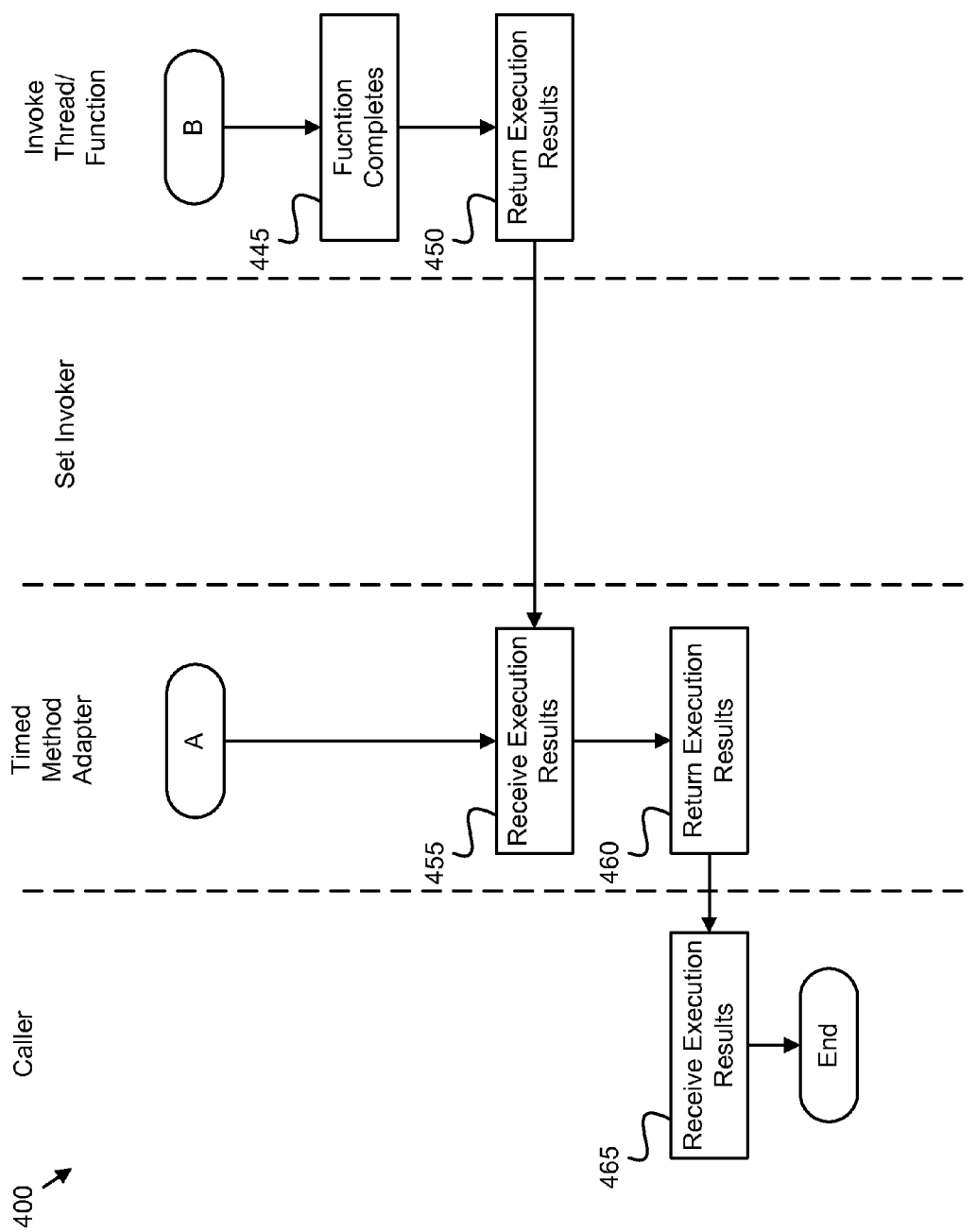

FIGS. 4A-4C are a schematic flow chart diagram illustrating one embodiment of a method 400 of applying timed operations of the present invention. The method 400 substantially includes the steps to carry out the functions presented above with respect to the operation of the described computer 100 and apparatus 200 of FIGS. 1-2. In one embodiment, the method 400 is implemented with a computer readable storage medium comprising a computer readable program stored on a tangible storage device. The computer readable storage medium may be integrated into a computing system, such as the computer 100, wherein the computer readable program executed by the computing system performs the method 400.

The method 400 starts, and in one embodiment, the caller 205 calls 405 the timed method adapter 210 in place of the function 230, passing the timed method adapter 210 the object 225 and the argument 235 for the function 230. In a certain embodiment, instructions for the caller 205 are modified to substitute the timed method adapter 210 for the function 230. Alternatively, the calling of the function 230 may be trapped by a listener and/or an operating system. The listener and/or operating system may then call 405 the timed method adapter 210 for the caller 205.

In one embodiment, the caller 205 calls 405 the timed method adapter 210 directly, as illustrated by the instruction "adapter.invoke(O, F, A);" of Table 1. In an alternate embodiment, the caller 205 calls 405 the timed method adapter 210 indirectly as illustrated by the instruction "oos.writeObject( . . . );" of Table 3.

The timed method adapter 210 calls 410 the set invoker 215, passing the set invoker 215 the object 225, the function 230, and the argument 235. In one embodiment, the set invoker 215 and the timed method adapter 210 are independent threads executing concurrently. The set invoker 215 saves 420 the argument 235, calls 425 the invoke thread 220, and returns 435 to the timed method adapter 210.

The invoke thread 220 may also be an independent thread executing concurrently with the set invoker 215 and the timed method adapter 210. The invoke thread 220 invokes 430 the function 230, passing the function 230 the object 225 and the argument 235. The function 230 may also be executed as an independent thread, executing concurrently with the invoke thread 220, the set invoker 215, and the timed method adapter 210.

The timed method adapter 210 waits 440 for an execution result 240 from the function 230 and monitors 440 for an expiration of the timeout 260. In one embodiment, the timed method adapter 210 determines an expiration time when the timeout 260 expires. The timed method adapter 210 may periodically poll a clock for a system time. When the system time exceeds the expiration time, the timed method adapter 210 may detect the expiration of the timeout 260.

In alternate embodiment, the timed method adapter 210 communicates the value of the timeout 260 to a timer. The timer may count down the time interval of the timeout 260. When the timer reaches zero, the timer may issue an interrupt. The timed method adapter 210 may receive the interrupt and detects the expiration of the timeout 260.

FIG. 4B continues to illustrate one embodiment of the method 400 of applying timed operations of FIG. 4A at "B," wherein if the function 230 completes 445 execution of the function's process before expiration of the timeout 260, the function 230 returns 450 the execution result 240. In one embodiment, the function 230 returns 450 the execution result 240 by writing execution result data to the object 225. The function 230 may further return 450 a specified value to indicate a successful completion with the execution result 240 stored in the object 225.

The timed method adapter 210 then receives 455 the execution result 240 and returns 460 the execution result 240 to the caller 205. In one embodiment, the timed method adapter 210 returns a pointer to the object 225 to the caller 205. The caller 205 receives 465 the execution result 460 and the method 400 ends.

FIG. 4C continues to illustrate one embodiment of the method 400 of applying timed operations of FIG. 4A at "A," wherein if the timeout 260 expires 470 before the function 230 returns the execution result 240, the timed method adapter 210 directs 475 the invoke thread 220 to cancel the function 230.

The invoke thread 220 cancels 480 the function 230. In one embodiment, the invoke thread 220 calls a higher-level management function that interrupts the execution of the function 230 and cancels the function 230. The function 230 terminates 485 without returning the execution result 240. In one embodiment, a state of the function 230 is saved. When the function 230 is called again, the state of the function 230 may be retrieved and the function 230 may resume execution.

The timed method adapter 210 returns 492 the timeout exception 245 to the caller 205. The caller 205 receives the timeout exception 245 and the method 400 ends. The method 400 applies timed operations to a non-timed function 230, allowing the existing non-timed function 230 to be used in a situation where timed operations are required. Thus libraries the functions 230 may continue to be employed as timed operations.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A non-transitory computer readable storage medium comprising a computer readable program stored on a tangible storage device for applying timed operations to non-timed functions, wherein the computer readable program when executed on a computer causes the computer to:

discover, by parsing source code, a caller calling a function, wherein the function does not perform timed operations;

receive the function;

reflect an object and an argument for the function;

encapsulate then function in a timed method adapter;

call the timed method adapter in place of the function from the caller, passing the timed method adapter the object and the argument for the function;

call a set invoker from the timed method adapter, passing the set invoker the object, the function, and the argument for the function;

call an invoke thread from the set invoker;

return from the set invoker to the timed method adapter;

wait for an execution result from the function at the timed method adapter, monitoring for an expiration of a timeout;

invoke the function from the invoke thread, passing the function the object and the argument;

if the function returns the execution result before expiration of the timeout, return the execution result to the caller; and if the timeout expires before the function returns the execution result, direct the invoke thread to cancel the function and return a timeout exception to the caller.

2. The computer readable storage medium of claim 1, wherein the computer readable program further causes the computer to reflect the object and the argument by:

reflecting the function with a reflector;
receiving the object and the argument for the function from the reflector; and wherein the timeout is a time interval.

3. The computer readable storage medium of claim 2, wherein the computer readable program further causes the computer to create an interface proxy for the object.

4. The computer readable storage medium of claim 3, wherein the timed method adapter is defined in the form: public Object invoke(O, F, A) throws Throwable, where O is the object, F is the function, and A is the argument.

5. An apparatus for applying timed operations to non-timed functions, the apparatus comprising:
a non-transitory computer readable storage medium storing a computer readable program executed by a processor, the computer readable program comprising:
an encapsulation module discovering, by parsing source code, a caller calling a function, wherein the function does not perform timed operations, receiving the function, reflecting an object and an argument for the function, encapsulating the function in a timed method adapter, wherein the caller calls the timed method adapter in place of the function, and passing the timed method adapter the object and the argument for the function;
the timed method adapter calling a set invoker, passing the set invoker the object, the function, and the argument for the function;
the set invoker saving the argument, calling an invoke thread, and returning to the timed method adapter;
the invoke thread invoking the function and passing the function the object and the argument;
the timed method adapter further waiting for an execution result from the function and monitoring for an expiration of a timeout, wherein if the function returns the execution result before expiration of the timeout, the timed method adapter returns the execution result to the caller else if the timeout expires before the function returns the execution result, the timed method adapter directs the invoke thread to cancel the function and returns a timeout exception to the caller.

6. The apparatus of claim 5, wherein a reflector reflects the object and the argument, and the timeout is a time interval.

7. The apparatus of claim 6, wherein the encapsulation module further creates an interface proxy for the object.

8. The apparatus of claim 7, wherein the timed method adapter is defined in the form: public Object invoke(O, F, A) throws Throwable, where O is the object, F is the function, and A is the argument.

9. A system for applying timed operations to non-timed functions, the system comprising:
a non-transitory computer readable storage medium storing a computer readable program executed by a processor, the computer readable program comprising:
an encapsulation module discovering, by parsing source code, a caller calling a function, wherein the function does not perform timed operation, receiving the function, reflecting an object and an argument for the function, and encapsulating the function in a timed method adapter;
the caller calling the timed method adapter in place of the function, passing the timed method adapter the object and the argument for the function;
the timed method adapter calling a set invoker, passing the set invoker the object, the function, and the argument for the function;
the set invoker saving the argument, calling an invoke thread, and returning to the timed method adapter;
the invoke thread invoking the function and passing the function the object and the argument;
the timed method adapter further waiting for an execution result from the function and monitoring for an expiration of a timeout, wherein if the function returns the execution result before expiration of the timeout, the timed method adapter returns the execution result to the caller else if the timeout expires before the function returns the execution result, the timed method adapter directs the invoke thread to cancel the function and returns a timeout exception to the caller.

10. The system of claim 9, wherein a reflector reflects the object and the argument and the timeout is a time interval.

11. The system of claim 10, the encapsulation module further creating an interface proxy for the object.

12. The system of claim 11, wherein the timed method adapter is defined in the form: public Object invoke(O, F, A) throws Throwable, where O is the object, F is the function, and A is the argument.

13. A method for deploying computer infrastructure, comprising integrating a non-transitory computer readable storage medium tangibly embodying a computer readable program into a computing system, wherein the program in combination with the computing system performs the following:
discovering, by parsing source code, a caller calling a function, wherein the function does not perform timed operations;
receiving the function;
reflecting an object and an argument for the function;
encapsulating the function in a timed method adapter with a timeout, wherein the timeout is a time interval;
replacing the function with the timed method adapter; calling the timed method adapter in place of the function from the caller, passing the timed method adapter the object and the argument for the function;
calling a set invoker from the timed method adapter, passing the set invoker the object, the function, and the argument for the function;
saving the argument from the set invoker;
calling an invoke thread from the set invoker;
returning from the set invoker to the timed method adapter;
waiting for an execution result from the function at the timed method adapter,
monitoring for an expiration of a timeout;
invoking the function from the invoke thread, passing the function the object and the argument;
if the function returns the execution result before expiration of the timeout, returning the execution result to the caller; and
if the timeout expires before the function returns the execution result, directing the invoke thread to cancel the function and return a timeout exception to the caller.

14. The method of claim 13, wherein a reflector reflects the object and the argument and the timeout is a time interval.

15. The method of claim 14, the method further comprising creating an interface proxy for the object.

16. The method of claim 15, wherein the timed method adapter is defined in the form: public Object invoke(O, F, A) throws Throwable, where O is the object, F is the function, and A is the argument.

* * * * *